United States Patent
Wang et al.

(10) Patent No.: US 11,374,411 B2
(45) Date of Patent: Jun. 28, 2022

(54) CONVERTER CONTROL METHOD AND DEVICE

(71) Applicants: NR ELECTRIC CO., LTD, Jiangsu (CN); NR ENGINEERING CO., LTD, Jiangsu (CN)

(72) Inventors: Jiacheng Wang, Jiangsu (CN); Yu Lu, Jiangsu (CN); Nannan Wang, Jiangsu (CN); Zhaoqing Hu, Jiangsu (CN); Yunlong Dong, Jiangsu (CN); Gang Li, Jiangsu (CN); Chongxue Jiang, Jiangsu (CN)

(73) Assignees: NR ELECTRIC CO., LTD, Jiangsu (CN); NR ENGINEERING CO., LTD, Jiangsu (CN)

( * ) Notice: Subject to any disclaimer, the term of this patent is extended or adjusted under 35 U.S.C. 154(b) by 246 days.

(21) Appl. No.: 16/759,309

(22) PCT Filed: Oct. 23, 2018

(86) PCT No.: PCT/CN2018/111427
§ 371 (c)(1),
(2) Date: Apr. 24, 2020

(87) PCT Pub. No.: WO2019/080834
PCT Pub. Date: May 2, 2019

(65) Prior Publication Data
US 2021/0222673 A1    Jul. 22, 2021

(30) Foreign Application Priority Data
Oct. 24, 2017    (CN) .......................... 201710999937.8

(51) Int. Cl.
*H02J 3/36*    (2006.01)
*H02J 3/38*    (2006.01)

(52) U.S. Cl.
CPC ................ *H02J 3/381* (2013.01); *H02J 3/36* (2013.01); *H02J 2300/28* (2020.01)

(58) Field of Classification Search
CPC .......... H02J 3/36; H02J 3/381; H02J 2300/28
See application file for complete search history.

(56) References Cited

U.S. PATENT DOCUMENTS

2020/0176993 A1*  6/2020  Brombach .............. F03D 9/257
2020/0251906 A1*  8/2020  Jiang-Häfner ...... H02M 7/7575

FOREIGN PATENT DOCUMENTS

CN    103904676    1/2016
CN    106329557    1/2017

(Continued)

*Primary Examiner* — Harry R Behm
(74) *Attorney, Agent, or Firm* — Michael L. Greenberg, Esq.; Greenberg & Lieberman, LLC (57) ABSTRACT

The invention relates to an island converter overload limit method and device for a bipolar flexible DC transmission system, and belongs to the field of DC transmission. During stable island operation, both bipolar converters adopt a voltage-frequency droop control strategy; and once it is detected that one converter is overloaded, the control mode of the overloaded converter is automatically switched to active-wattless power control from voltage-frequency droop control to fulfill an overload limit function. The method effectively avoids an overload of the bipolar flexible DC transmission system under island operation, effectively maintains the AC voltage and frequency stable, and has important guiding significance for applying island systems to DC power grids.

13 Claims, 2 Drawing Sheets

(56) References Cited

FOREIGN PATENT DOCUMENTS

CN 108123462 A * 6/2018
CN 108123467 A * 6/2018

* cited by examiner

CONVERTER CONTROL METHOD AND DEVICE

TECHNICAL FIELD

The invention belongs to the technical field of flexible DC transmission of power systems, and particularly relates to a converter control method and device.

BACKGROUND

Flexible DC power transmission is an important technical means for realizing mass multi-point collection of renewable energy, efficient utilization of clean energy and flexible consumption, and is an important technical support for rapid development of energy Internet. In the case of networking realized by flexible DC transmission systems, stable operation under island or weak systems is of great importance for fulfilling flexible networking and consumption of renewable energy.

Flexible DC transmission projects which have been put into operation at present generally adopt one converter or two converters having AC sides connected in parallel. In consideration of the requirements for the reliability and stability of continuous operation of the systems, bipolar flexible DC transmission systems formed by two converters having the AC sides connected in parallel are the future development direction of flexible DC transmission.

The flexible DC transmission systems are more suitable for being accessed to a new-energy island or passive system thanks to their power transmission flexibility; in this case, the bipolar flexible DC transmission systems is required to provide a stable AC voltage having a stable AC voltage magnitude and frequency, and thus, a converter station on the new-energy island side generally adopts voltage-frequency droop control. However, by adoption of such control method, the power input to the AC side of the converter from a new-energy station is uncontrollable, which may lead to overload of the converter due to excessive power from the new energy station, and if this is the case, the active power supplied by the converter to a DC power grid should be quickly decreased, which may otherwise cause converter blocking due to an excessively high voltage of the DC power grid and may even, in severe cases, result in damage to the converter and various expensive switch devices on a DC circuit.

In consideration of the above problems and existing immature methods for controlling converters accessed to new-energy island weak power grids or passive systems for engineering applications, it is necessary to develop a technical control scheme combining island control and overload control for engineering applications.

SUMMARY

The objective of the invention is to provide a converter control method and device to fulfill outward power transmission from a new-energy island weak power grid or a passive system in a bipolar flexible DC transmission system.

The technical solution adopted by the invention to fulfill the above objective is as follows:

A converter control method, wherein two converters having AC sides connected in parallel constitute a bipolar system; when the system operates stably, the converters adopt a voltage-frequency droop control strategy; and when one converter is overloaded first, the control mode of the overloaded converter is automatically switched to active-wattless power control from voltage-frequency droop control so as to limit an overload. The converter control method comprises the following steps;

1) acquiring measured active power $P_{s1}$ absorbed by the AC side of one converter; determining whether or not the active power $P_{s1}$ is out of limit by means of an overload limit logic, wherein if the active power $P_{s1}$ is out of the limit, said one converter is determined to be overloaded, and entered into a control mode switching logic so as to switch the control mode of said one converter to active-wattless power control from voltage-frequency droop control;

2) obtaining, when it is detected that one converter is overloaded, an active power reference value and a wattles power reference value of said one converter by means of the overload limit logic through processing, and using an active overload limit reference value $P_{ref\_oll}$ and a wattless overload limit reference value $Q_{ref\_oll}$ which are automatically set by the overload limit logic as instruction inputs of the active-wattless power control; and 3) carrying out, when it is detected that the converter adopting the active-wattless power control is overloaded, phase locking on an AC-side voltage $U_{so\ abc}$ of the overloaded converter so as to obtain a system voltage phase control value $\theta_{ref}$ controlled by an inner loop current.

Furthermore, in Step 2), the maximum permissible active power to be absorbed by each converter is set as $P_{lim}$, and the maximum permissible wattless power to be absorbed by each converter is set as $Q_{lim}$; the total active power $P_{all}$ absorbed by the AC sides of the two converters is acquired by using the overload limit logic, and the active power $P_{s1}$ absorbed by the AC side of said one converter is acquired; and the overload limit logic is one the following two control logics:

i) when $|P_{s1}|>|P_{lim}|$ and $|P_{all}-P_{s1}|\leq|P_{lim}|$, switching the control mode of said one converter to the active-wattless power control from the voltage-frequency droop control, and setting the reference input limits $P_{lim}$ and $Q_{lim}$ of the active-wattless power control to meet a power circle and the following conditions:

$$P_{ref\_oll}=P_{set}=P_{lim};$$

$$Q_{ref\_oll}=Q_{set}=Q_{lim};$$

ii) when $|P_{s1}|>|P_{lim}|$ and $|P_{all}-P_{s1}|\leq|P_{lim}|$, switching the control mode of said one converter to the active-wattless power control from the voltage-frequency droop control, and setting the reference input limits $P_{lim}$ and $Q_{lim}$ of the active-wattless power control to meet a power circle and the following conditions:

$$P_{ref\_oll}=P_{set},\text{ and }|P_{set}|<|P_{lim}|;$$

$$Q_{ref\_oll}=Q_{set},\text{ and }|Q_{set}|<|Q_{lim}|;$$

where, $P_{set}$ is a set value of the active power absorbed by said one converter, and $Q_{set}$ is a set value of the wattless power absorbed by said one converter.

Furthermore, in the overload control logic i) of said one converter, the set value of the active power absorbed by said one converter meets $P_{set}=P_{lim}$ when said one converter has been overloaded and been switched to the active-wattless power control; if the other converter connected in parallel to the AC side of said one converter is also overloaded, namely $|P_{all}|>2|P_{lim}|$, a backup solution is adopted to make sure that the power of the other converter will not be out of limit.

Furthermore, in the overload control logic ii) of said one converter, the set value of the active power absorbed by said one converter meets $|P_{set}|<|P_{lim}|$ when said one converter has been overloaded and been switched to the active-wattless power control; if the other converter connected in parallel to the AC side of the converter is also overloaded:

(1) if $|P_{all}| \leq 2|P_{lim}|$, the active overload limit reference value $P_{ref\_oll}$ of said one converter is adjusted to:

$$P_{ref\_oll} \geq P'_{set} = P_{set} + (P_{all} - P_{s1} - P_{lim}), \text{ and}$$
$$|P_{ref\_oll}| \leq |P_{lim}|;$$

(2) if $|P_{all}| > 2|P_{lim}|$, the active overload limit reference value $P_{ref\_oll}$ of said one converter is adjusted to the maximum value $P_{lim}$; if the other converter is still overloaded, a backup solution is adopted to make sure that the power of the other converter will not be out of limit.

Furthermore, the backup solution includes at least one of removing a part of fans, running AC-side energy dissipation device, running a DC-side energy dissipation device, and blocking the converter and turning off an AC incoming switch.

Furthermore, when the exchange power between the one overloaded converter and the outside has restored into a normal range and the other converter connected in parallel to the AC side of the one overloaded converter is not overloaded, one of the following two processing modes is adopted:

a) exiting the one overloaded converter from the overload limit logic, maintaining the control mode of the one overloaded converter at the active-wattless power control, setting the active overload limit reference value $P_{ref\_oll}$ of the one overloaded converter to be less than or equal to the maximum permissible active power $P_{lim}$ to be exchanged of the one overloaded converter, and setting the wattless overload reference value $Q_{ref\_oll}$ of the one overloaded converter to be less than or equal to the maximum permissible wattless power $Q_{lim}$ to be exchanged of the one overloaded converter, that is:

$$|P_{ref\_oll}| \leq |P_{lim}|;$$

$$|Q_{ref\_oll}| \leq |Q_{lim}|;$$

b) exiting the one overloaded converter from the overload limit logic, and switching the control mode of the one overloaded converter automatically or manually to the voltage-frequency droop control.

Furthermore, in Step 3), an inner loop current controller adopts current vector control.

A converter control device, wherein two converters having AC sides connected in parallel constitute a bipolar system. The converter control device is comprised of a stable operation control unit, an overload determining unit, and a control mode switching unit, wherein:

the stable operation control unit controls the converters to adopt a voltage-frequency droop control strategy when the system operates steadily:

the overload determining unit determines whether or not one converter is overloaded and, wherein if aid one converter is determined to be overloaded, the overload determining unit enables the control mode switching unit;

the control mode switching unit automatically switches the control mode of the overloaded converter to active-wattless power control from voltage-frequency droop control;

the overload determining unit comprises an active power acquisition sub-unit and an active power out-of-limit determining sub-unit, wherein:

the active power acquisition sub-unit acquires measured active power $P_{s1}$ absorbed by the AC side of each converter and outputs the measured active power $P_{s1}$ to the active power out-of-limit determining sub-unit; and the active power out-of-limit determining sub-unit determines whether or not the measured active power $P_{s1}$ is out of limit by means of an overload limit logic and, wherein if the active power $P_{s1}$ is out of the limit, the corresponding converter is determined to be overloaded and the control mode switching unit is entered into;

the control mode switching unit comprises an active-wattless power reference value setting sub-unit and a system voltage phase control value calculation unit, wherein:

the active-wattless power reference value setting sub-unit obtains active and wattless power reference values of the converter by means of the overload limit logic through processing when it is detected that the converter is overloaded, and uses an active overload limit reference value $P_{ref\_oll}$ and a wattless overload limit reference value $Q_{ref\_oll}$ which are automatically set by the overload limit logic as instruction inputs of the active-wattless power control; and the system voltage phase control value calculation unit carried out, when it is detected that the converter adopting the active-wattless power control is overloaded, phase locking on an AC-side voltage $U_{so\_abc}$ of this converter so as to obtain a system voltage phase control value $\theta_{ref}$ controlled by an inner loop current.

Furthermore, the active-wattless power reference value setting sub-unit comprises a maximum active-wattless power setting unit, a total active power acquisition unit and a reference input limit unit, wherein:

the maximum active-wattless power setting unit sets the maximum permissible active power to be absorbed by each converter as $P_{lim}$, and sets the maximum permissible wattless power to be absorbed by each converter as $Q_{lim}$;

the total active power acquisition unit acquires the total active power $P_{all}$ absorbed by the AC sides of the two converters and outputs the total active power $P_{all}$ to the reference input limit unit;

the reference input limit unit is a first reference input limit unit or a second reference input limit unit;

when $|P_{s1}| > |P_{lim}|$ and $|P_{all} - P_{s1}| \leq |P_{lim}|$, the control mode of said one converter is switched by the first reference input limit unit to the active-wattless power control from the voltage-frequency droop control, and reference input limits $P_{lim}$ and $Q_{lim}$ of the active-wattless power control are set to meet a power circle and the following conditions:

$$P_{ref\_oll} = P_{set} \leq P_{lim};$$

$$Q_{ref\_oll} = Q_{set} = Q_{lim};$$

when $|P_{s1}| > |P_{lim}|$ and $|P_{all} - P_{s1}| \leq |P_{lim}|$, the control mode of said one converter is switched by the second reference input limit unit to the active-wattless power control from the voltage-frequency droop control, and reference input limits $P_{lim}$ and $Q_{lim}$ of the active-wattless power control are set to meet a power circle and the following conditions:

$$P_{ref\_oll} = P_{set}, \text{ and } |P_{set}| < |P_{lim}|;$$

$$Q_{ref\_oll} = Q_{set}, \text{ and } |Q_{set}| < |Q_{lim}|;$$

wherein, $P_{set}$ is a set value of the active power absorbed by said one converter, and $Q_{set}$ is a set value of the wattless power absorbed by said one converter.

Furthermore, in the first reference input limit unit, the set value of the active power absorbed by said one converter meets $P_{set} = P_{lim}$ when said one converter has been overloaded and been switched to the active-wattless power control; if the other converter connected in parallel to the AC side of said one converter is also overloaded, namely $|P_{all}|>2|P_{lim}|$, a backup solution is adopted to make sure that the power of the other converter will not be out of limit.

Furthermore, in the second reference input limit unit, the set value of the active power absorbed by said one converter meets $|P_{set}|<|P_{lim}|$ when said one converter has been overloaded and been switched to the active-wattless power control; if the other converter connected in parallel to the AC side of the converter is also overloaded:

(1) if $|P_{all}|\leq 2|P_{lim}|$, the active overload limit reference value $P_{ref\_oll}$ of said one converter is adjusted to:

$P_{ref\_oll} \geq P'_{set} = P_{set} + (P_{all} - P_{s1} - P_{lim})$, and
$|P_{ref\_oll}| \leq |P_{lim}|$;

(2) if $|P_{oll}|>2|P_{lim}|$, the active overload limit reference value $P_{ref\_oll}$ of said one converter is adjusted to the maximum value $P_{lim}$; if the other converter is still overloaded, a backup solution is adopted to make sure that the power of the other converter will not be out of limit.

Furthermore, the converter control device further comprises:

an overload restoration determining unit, used for determining whether or not the exchange power between the overloaded converter and the outside has restored into a normal range and whether or not the other converter connected in parallel to the AC side of this converter is not overloaded, and, if the exchange power between the overloaded converter and an outside has been restored into a normal range and the other converter connected in parallel to the AC side of this converter is not overloaded, the overload restoration determining unit triggers an over overload limit exit logic unit; and the overload limit exit logic unit, comprising a first overload limit exit logic unit and a second overload limit exit logic unit;

the first overload limit exit logic unit enables this converter to exit from the one overloaded limit logic, maintains the control mode of the one overloaded converter at the active-wattless power control, and sets the overload limit reference value $P_{ref\_oll}$ of the one overloaded converter to be less than or equal to the maximum permissible active power $P_{lim}$ to be exchanged of the one overloaded converter and the wattless overload reference value $Q_{ref\_oll}$ of this converter to be less than or equal to the maximum permissible wattless power $Q_{lim}$ to be exchanged of the one overloaded converter, that is:

$|P_{ref\_oll}| \leq |P_{lim}|$;

$|P_{ref\_oll}| \leq |Q_{lim}|$;

the second overload limit exit logic unit enables the one overloaded converter to exit from the overload limit logic, and automatically or manually switches the control mode of the one overloaded converter to the voltage-frequency droop control.

By adoption of the above technical solutions, the invention has the following beneficial effects:

(1) The converter control method of the invention guarantees quick switching to the overload limit logic to restrain power increase of the AC sides of the converters when the converters are overloaded in an island operation mode, so that quick voltage boosting of a DC power grid caused by incontrollable power of the island-controlled converters is prevented, and safe and stable operation of the converters and various devices thereof is ensured.

(2) According to the converter control method of the invention, after the power of the overloaded converter restores to the normal range, the converter exits from the overload limit logic, then the control mode of the converters is flexibly selected to active-wattless power control or voltage-frequency droop control, and stable operations of the island system restored from the overload state can be guaranteed in both modes.

(3) The converter control method of the invention has a simple control concept, is more suitable for engineering applications, and has important guiding significance for accessing new energy island or wattless weak systems to DC power grids.

DETAILED DESCRIPTION OF EMBODIMENTS

Embodiments of the invention are expounded below in combination with the accompanying drawings and are implemented on the basis of the technical solution of the invention, and a detailed implementation and a specific operation process are given. The protection scope of the invention is not limited to the following embodiments.

Figure 1:
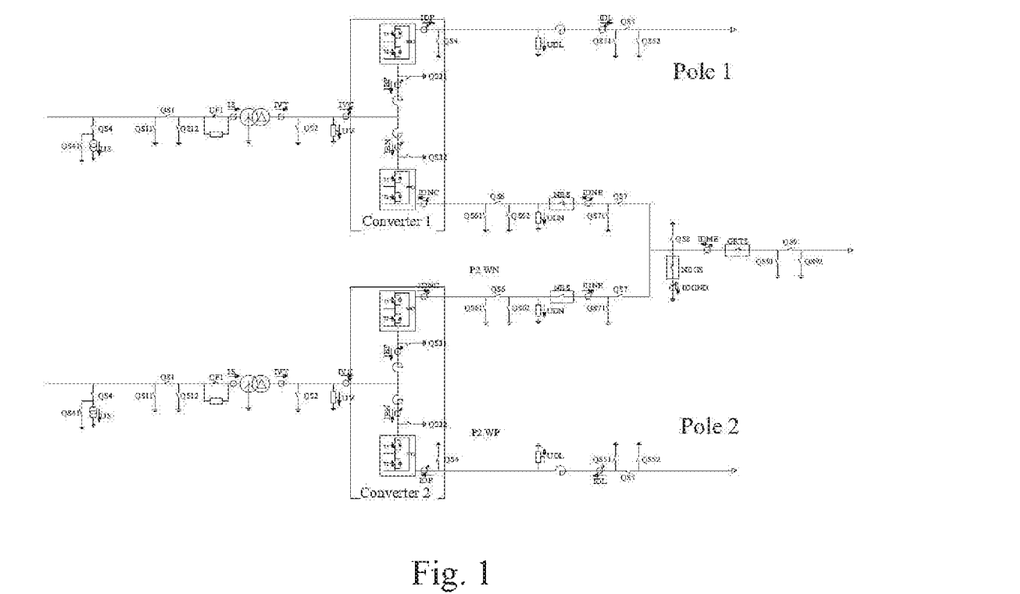
FIG. 1 is a schematic diagram of a true bipolar topological structure.

According to a converter control method of the invention, the AC sides of two converters are connected in parallel, and the specific topological structure of the two converters is shown in FIG. 1. Each converter serves as a pole, and the two converters constitute a bipolar flexible DC system. In the island operation embodiment shown in FIG. 2, the AC bus sides of the two converters are connected with a new-energy island wind power plant. To guarantee stable operation of new-energy islands, each polar converter in the bipolar flexible DC system adopts voltage-frequency droop control, and a stable AC voltage magnitude and frequency are supplied to the new-energy island wind power plant.

Figure 2:
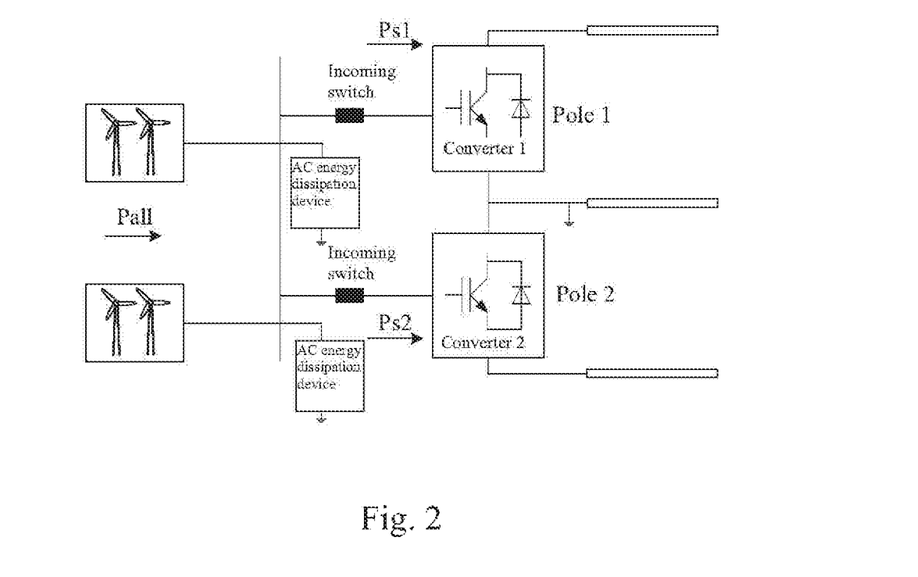
FIG. 2 is a topological diagram of a bipolar flexible DC transmission system accessed to a new-energy island wind power plant.

The converters in the bipolar flexible DC transmission system in FIG. 2 absorb active power provided by the wind power plant, and the two converters are respectively referred to as a converter 1 and a converter 2. In this embodiment, power absorbed by the converters from the AC sides is defined as positive power and is displayed by a per-unit value, the reference value of the per-unit value is the rated capacity of each converter, and the limit value of active power absorbed by the AC sides of the converters is set as $P_{lim}$. During stable operation, the measured active power absorbed by the AC side of the converter 1 meets $P_{s1}<P_{lim}$, and the measured active power absorbed by the AC side of the converter 2 meets $P_{s2}<P_{lim}$.

Figure 3:
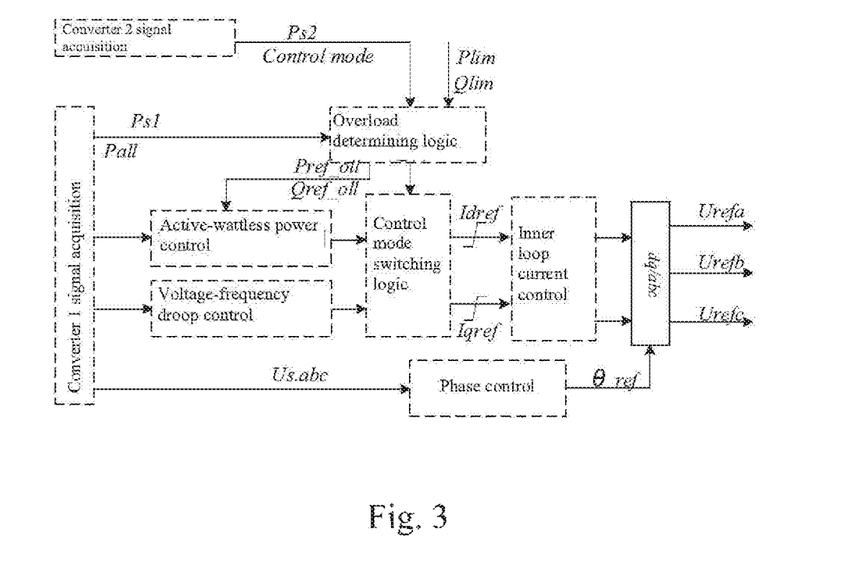
FIG. 3 is a block diagram of an overload control logic of an island converter.

If the output of the wind power plant constantly increases, the converter 1 will be overloaded first, and at this moment, as illustrated by FIG. 3 which is an overload control block diagram, the control mode of the converter 1 is automatically switched to active-wattless power control from voltage-frequency droop control, and the converter 2 is stilled maintained at voltage-frequency droop control. In this case, the maximum active power $P_{lim}$ absorbed by the AC side of the converter 1 is the rated capacity of the converter 1, that is, $P_{lim}=1$ pu, and the maximum permissible wattless power to be exchanged under the active power $P_{lim}$ is $Q_{lim}$ according to a power circle diagram. If the active overload limit reference value of the converter 1 is set as $P_{ref\_oll}=P_{set1}=0.5$ pu<$P_{lim}$ and the wattless overload limit reference value is set as $Q_{ref\_oll}=Q_{set1}=0$ pu, and the measured active power absorbed by the AC side of the converter 1 is finally stabilized to $P_{s1}=0.5$ pu. At this embodiment, the converter 2 is still maintained at voltage-frequency droop control, and after the converter 1 is overloaded and an overload limit logic is executed, the converter 2 is made to work in any one of the following three conditions, and the control mode of the overload limit logic in this embodiment is introduced below:

(1) The total active power absorbed by the AD sides meets $P_{all}=1.5$ pu≤2 pu

At this moment, the active power absorbed by the converter 2 is 1 pu, the converter 2 is not overloaded, the converter 1 may exit from the overload limit logic, and the control mode of the converter 1 may be switched to voltage-frequency droop control from active-wattless power control.

(2) The converter 2 is overloaded and the total active power absorbed by the AD sides meets $P_{all}=1.9$ pu≤2 pu At this moment, the active power absorbed by the converter 2 is 1.4 pu, the converter 2 is overloaded, the overload limit logic of the converter 1 is maintained, that is the converter 1 is maintained at active-wattless power control, the active overload limit reference value of the converter 1 is adjusted to meet $P_{ref\_oll}=P_{set1}+(P_{all}-P_{s1}-P_{lim})=0.5+(1.9-0.5-1)=0.9$ pu<$P_{lim}$, and the active power absorbed by the converter 2 is decreased to 1 pu. After the two converters become stable, the measured active power absorbed by the AC side of the converter 1 meets $P_{s1}=0.9$ pu, and the measured active power absorbed by the AC side of the converter 2 meets $P_{s2}=1$ pu. At this moment, the converter 1 may exit from the overload limit logic, and the control mode of the converter 1 may be switched to voltage-frequency droop control from active-wattless power control.

(3) The converter 2 is overloaded and the total active power absorbed by the AC sides meets $P_{oll}=2.1$ pu>2 pu At this moment, the active power absorbed by the converter 2 is 1.6 pu, the converter 2 is overloaded, the overload limit logic of the converter 1 is maintained, that is, the converter 1 is maintained at active-wattless power control, and the active overload limit reference value of the converter 1 is adjusted to meet $P_{ref\_oll1}=P_{lim}-1$ pu; after adjustment, the active power absorbed by the converter 2 is decreased to 1.1 pu, if the output of fans decreases in this period, the active power $P_{s2}$ absorbed by the AC side of the converter 2 restores to a normal power range and is kept stable, then the converter 1 may exit from the overload limit logic, and the control mode of the converter 1 may be switched to voltage-frequency droop control from active-wattless power control; otherwise, a part of the fans are removed after an AC-side energy dissipation device is nm, and then, so as to decrease the active power $P_{all}$ absorbed by the AC side of the converter to be less than 2 pu.

Figure 4:
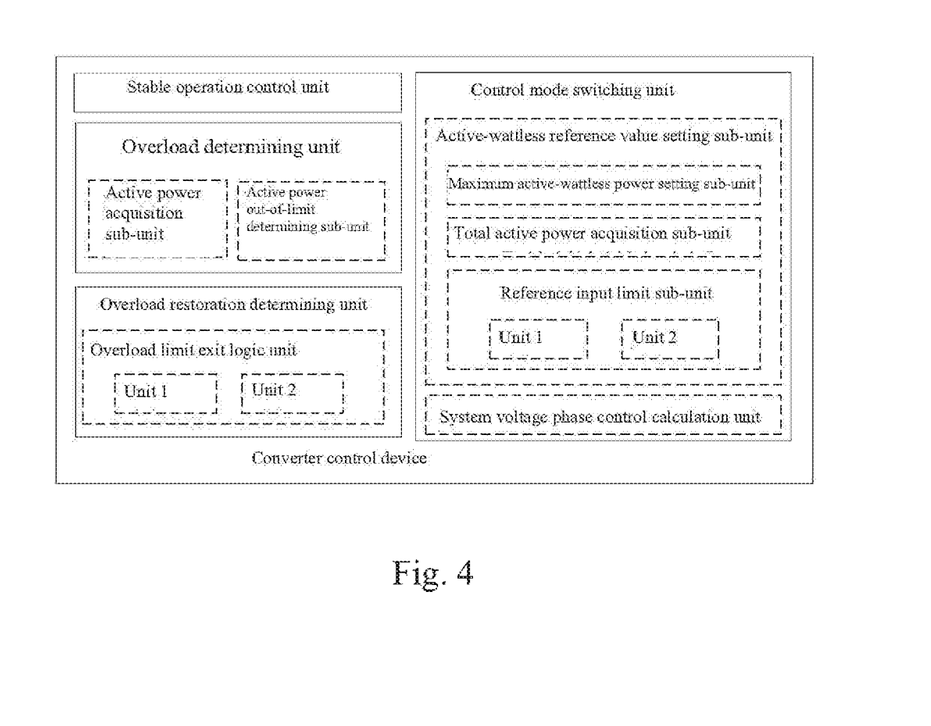
FIG. 4 is a structural diagram of a converter control system.

As shown in FIG. 4, a control system for the converter 1 is designed in combination with the specific control method in the above embodiment. The control system comprises a stable operation control unit, an overload determining unit, a control mode switching unit and an overload restoration determining unit. The stable operation control unit realizes a voltage-frequency droop control strategy of the converters during stable operation. The overload determining unit detects whether or not the converters are overloaded and comprises an active power acquisition sub-unit and an active power out-of-limit determining sub-unit, wherein the active power acquisition sub-unit acquires the measured active power $P_{s1}$ absorbed by the AC side of the converter 1, and when the active power out-of-limit determining sub-unit detects that $P_{s1}>P_{lim}$, the converter 1 is overloaded, and the control mode switching unit is enabled. The control mode switching unit consists of an active-wattless power reference value setting sub-unit and a system voltage phase control calculation sub-unit and is used for switching the converter 1 to an active-wattless power control strategy from the voltage-frequency droop control strategy. In this embodiment, the active-wattless power reference value setting sub-unit obtains an active-wattless reference value $P_{ref\_oll1}=P_{set1}=0.5$ pu<$P_{lim}$ and a wattless overload limit reference value $Q_{ref\_oll1}=Q_{set1}=0$ pu by processing of a second reference input limit sub-unit, and the measured active power absorbed by the AC side of the converter 1 is finally stabilized to $P_{s1}=0.5$ pu. At this moment, the converter 2 is stilled maintained at voltage-frequency droop control; after the converter 1 is overloaded and the overload limit logic is executed, the total active power acquisition unit detects that the total active power absorbed by the AC sides meets $P_{s1}=1.9$ pu, if the reference input limit unit detects that the active power absorbed by the converter 2 is overloaded, assume the active power absorbed by the converter 2 is 1.4 pu, the overload limit logic of the converter 1 is maintained, the reference input limit sub-unit adjusts the active load limit reference value of the converter 1 to meet $P_{ref\_oll1}=P_{set1}+(P_{all}-P_{s1}-P_{lim})=0.5+(1.9-0.5-1)=0.9$ pu<$P_{lim}$, and the active power absorbed by the converter 2 is decreased to 1 pu. After the two converters become stable, the measured active power absorbed by the AC side of the converter 1 meets $P_{s1}=0.9$ pu, and the measured active power absorbed by the AC side of the converter 2 meets $P_{s2}=1$ pu. The control system for the converter 1 enters into the overload restoration determining unit and executes a second unit of the overload limit exit logic unit, and the control mode of the converter 1 is switched to voltage-frequency droop control from active-wattless power control.

The above embodiments are only used for explaining the technical concept of the invention, and are not intended to limit the protection scope of the invention. Any transformations made on the basis of the technical solution according to the technical concept of the invention should fall within the protection scope of the invention.

What is claimed is:

1. A converter control method, wherein two converters having AC sides connected in parallel constitute a bipolar system; when the system operates stably, the converters adopt a voltage-frequency droop control strategy; when one of the converters is overloaded first, a control mode of the overloaded converter is automatically switched to active-wattless power control from voltage-frequency droop control so as to limit an overload; the converter control method comprises the following steps:

1) acquiring measured active power $P_{s1}$ absorbed by the AC side of one converter and determining whether or not the active power $P_{s1}$ is out of limit by means of an overload limit logic, wherein if the active power $P_{s1}$ is out of the limit, said one converter is determined to be overloaded, and entered into a control mode switching logic so as to switch the control mode of said one converter to active-wattless power control from voltage-frequency droop control;

2) obtaining, when it is detected that one converter is overloaded, an active power reference value and a wattless power reference value of said one converter by the overload limit logic through processing, and using an active overload limit reference value $P_{ref\_oll}$ and a wattless overload limit reference value $Q_{ref\_oll}$ which are automatically set by the overload limit logic as instruction inputs of the active-wattless power control; and 3) carrying out, when it is detected that the converter adopting the active-wattless power control is overloaded, phase locking on an AC-side voltage $U_{so\_abc}$ of the overloaded converter so as to obtain a system voltage phase control value $\theta_{ref}$ controlled by an inner loop current.

2. The converter control method according to claim 1, wherein in Step 2), a maximum permissible active power to be absorbed by each said converter is set as $P_{lim}$, and a maximum permissible wattless power to be absorbed by each said converter is set as $Q_{lim}$; total active power $P_{oll}$ absorbed by the AC sides of the two converters is acquired by using the overload limit logic, and active power $P_{s1}$ absorbed by the AC side of said one converter is acquired; and the overload limit logic is one of the following two control logics:

i) when $|P_{s1}|>|P_{lim}|$ and $|P_{oll}-P_{s1}|\leq|P_{lim}|$, switching the control mode of said one converter to the active-wattless power control from the voltage-frequency droop control, and setting the reference input limits $P_{lim}$ and $Q_{lim}$ of the active-wattless power control to meet a power circle and the following conditions:

$$P_{ref\_oll}=P_{set}=P_{lim};$$

$$Q_{ref\_oll}=Q_{set}=Q_{lim};$$

ii) when $|P_{s1}|>|P_{lim}|$ and $|P_{oll}-P_{s1}|\leq|P_{lim}|$, switching the control mode of said one converter to the active-wattless power control from the voltage-frequency droop control, and setting the reference input limits $P_{lim}$ and $Q_{lim}$ of the active-wattless power control to meet a power circle and the following conditions:

$$P_{ref\_oll}=P_{set}, \text{ and } |P_{set}|<|P_{lim}|;$$

$$Q_{ref\_oll}=Q_{set}, \text{ and } |Q_{set}|<|Q_{lim}|;$$

where $P_{set}$ is a set value of the active power absorbed by said one converter, and $Q_{set}$ is a set value of the wattless power absorbed by said one converter.

3. The converter control method according to claim 2, wherein in the overload control logic i) of said one converter, the set value of the active power absorbed by said one converter meets $P_{set}=P_{lim}$ when said one converter has been overloaded and been switched to the active-wattless power control; if the other converter connected in parallel to the AC side of said one converter is also overloaded, namely $|P_{oll}|>2|P_{lim}|$, a backup solution is adopted to make sure that the power of the other converter will not be out of limit.

4. The converter control method according to claim 2, wherein in the overload control logic ii) of said one converter, the set value of the active power absorbed by said one converter meets $|P_{set}|<|P_{lim}|$ when said one converter has been overloaded and been switched to the active-wattless power control; if the other converter connected in parallel to the AC side of the converter is also overloaded:

(1) if $|P_{oll}|\leq2|P_{lim}|$, the active overload limit reference value $P_{ref\_oll}$ of said one converter is adjusted to:

$$P_{ref\_oll}\geq P'_{set}=P_{set}+(P_{oll}-P_{s1}-P_{lim}), \text{ and}$$
$$|P_{ref\_oll}|\leq|P_{lim}|;$$

(2) if $|P_{oll}|>2|P_{lim}|$, the active overload limit reference value $P_{ref\_oll}$ of said one converter is adjusted to the maximum value $P_{lim}$; if the other converter is still overloaded, a backup solution is adopted to make sure that the power of the other converter will not be out of limit.

5. The converter control method according to claim 3, wherein the backup solution includes at least one of removing a part of fans, running an AC-side energy dissipation device, running a DC-side energy dissipation device, and blocking the converter and turning off an AC incoming switch.

6. The converter control method according to claim 1, wherein when exchange power between the one overloaded converter and an outside has been restored into a normal range and the other converter connected in parallel to the AC side of the one overloaded converter is not overloaded, one of the following two processing modes is adopted:

a) exiting the one overloaded converter from the overload limit logic, maintaining the control mode of the one overloaded converter at the active-wattless power control, setting the active overload limit reference value $P_{ref\_oll}$ of the one overloaded converter to be less than or equal to the maximum permissible active power $P_{lim}$ to be exchanged of the one overloaded converter, and setting the wattless overload limit reference value $Q_{ref\_oll}$ of the one overloaded converter to be less than or equal to the maximum permissible wattless power $Q_{lim}$ to be exchanged of the one overloaded converter, that is:

$$|P_{ref\_oll}|\leq|P_{lim}|;$$

$$|Q_{ref\_oll}|\leq|Q_{lim}|;$$

b) exiting the one overloaded converter from the overload limit logic, and switching the control mode of the one overloaded converter automatically or manually to the voltage-frequency droop control.

7. The converter control method according to claim 1, wherein in Step 3), an inner loop current controller adopts current vector control.

8. A converter control device, wherein two converters having AC sides connected in parallel constitutes a bipolar system, and the converter control device comprises a stable operation control unit, an overload determining unit, and a control mode switching unit, wherein:

the stable operation control unit controls the converters to adopt a voltage-frequency droop control strategy when the system operates stably;

the overload determining unit determines whether or not one converter is overloaded and, wherein if said one converter is determined to be overloaded, the overload determining unit enables the control mode switching unit; and the control mode switching unit automatically switches a control mode of the overloaded converter to active-wattless power control from voltage-frequency droop control;

the overload determining unit comprises an active power acquisition sub-unit and an active power out-of-limit determining sub-unit, wherein:

the active power acquisition sub-unit acquires measured active power $P_{s1}$ absorbed by the AC side of each said converter and outputs the measured active power $P_{s1}$ to the active power out-of-limit determining sub-unit; and the active power out-of-limit determining sub-unit determines whether or not the measured active power $P_{s1}$ is out of limit by means of an overload limit logic and, wherein if the active power $P_{s1}$ is out of the limit, the corresponding converter is determined to be overloaded and the control mode switching unit is entered into;

the control mode switching unit comprises an active-wattless power reference value setting sub-unit and a system voltage phase control value calculation unit, wherein:

the active-wattless power reference value setting sub-unit obtains, when it is detected that one converter is overloaded, active and wattless power reference values by means of the overload limit logic through processing, and uses an active overload limit reference value $P_{ref\_oll}$ and a wattless overload limit reference value $Q_{ref\_oll}$ which are automatically set by the overload limit logic as instruction inputs of the active-wattless power control; and the system voltage phase control value calculation unit carries out, when it is detected that the converter adopting the active-wattless power control is overloaded, phase locking on the AC-side voltage $U_{so\_abc}$ of the overloaded converter, so as to obtain a system voltage phase control value $\theta_{ref}$ controlled by an inner loop current.

9. The converter control device according to claim 8, wherein the active-wattless power reference value setting sub-unit comprises a maximum active-wattless power setting unit, a total active power acquisition unit and a reference input limit unit, wherein:

the maximum active-wattless power setting unit sets a maximum permissible active power to be absorbed by each said converter as $P_{lim}$, and sets a maximum permissible wattless power to be absorbed by each said converter as $Q_{lim}$;

the total active power acquisition unit acquires total active power $P_{all}$ absorbed by the AC sides of the two converters and outputs the total active power $P_{all}$ to the reference input limit unit;

the reference input limit unit is a first reference input limit unit or a second reference input limit unit;

when $P_{s1}>|P_{lim}|$ and $|P_{all}-P_{s1}|\leq|P_{lim}|$, the control mode of said one converter is switched by the first reference input limit unit to the active-wattless power control from the voltage-frequency droop control, and reference input limits $P_{lim}$ and $Q_{lim}$ of the active-wattless power control are set to meet a power circle and the following conditions:

$P_{ref\_oll}=P_{set}=P_{lim}$;

$Q_{ref\_oll}=Q_{set}=Q_{lim}$;

when $|P_{s1}|>|P_{lim}|$ and $|P_{all}-P_{s1}|\leq|P_{lim}|$, the control mode of said one converter is switched by the second reference input limit unit to the active-wattless power control from voltage-frequency droop control, and reference input limits $P_{lim}$ and $Q_{lim}$ of the active-wattless power control are set to meet a power circle and the following conditions:

$P_{ref\_oll}=P_{set}$, and $|P_{set}|<|P_{lim}|$;

$Q_{ref\_oll}=Q_{set}$, and $|Q_{set}|<|Q_{lim}|$;

wherein, $P_{set}$ is a set value of the active power absorbed by said one converter, and $Q_{set}$ is a set value of the wattless power absorbed by said one converter.

10. The converter control device according to claim 9, wherein in the first reference input limit unit, the set value of the active power absorbed by said one converter meets $P_{set}=P_{lim}$ when said one converter has been overloaded and been switched to the active-wattless power control; if the other converter connected in parallel to the AC side of said one converter is also overloaded, namely $|P_{all}|>2|P_{lim}|$, a backup solution is adopted to make sure that the power of the other converter will not be out of limit.

11. The converter control device according to claim 9, wherein in the second reference input limit unit, the set value of the active power absorbed by said one converter meets $|P_{set}|<|P_{lim}|$ when said one converter has been overloaded and been switched to the active-wattless power control; if the other converter connected in parallel to the AC side of the converter is also overloaded:

(1) if $|P_{all}|\leq2|P_{lim}|$, the active overload limit reference value $P_{ref\_oll}$ of said one converter is adjusted to:

$P_{ref\_oll}\geq P'_{set}=P_{set}+(P_{all}-P_{s1}-P_{lim})$, and $|P_{ref\_oll}|\leq|P_{lim}|$;

(2) if $|P_{all}|>2|P_{lim}|$, the active overload limit reference value $P_{ref\_oll}$ of said one converter is adjusted to the maximum value $P_{lim}$; if the other converter is still overloaded, a backup solution is adopted to make sure that the power of the other converter will not be out of limit.

12. The converter control device according to claim 8, wherein further comprises:

an overload restoration determining unit, used for determining whether or not exchange power between the overloaded converter and an outside has been restored into a normal range and whether or not the other converter connected in parallel to the AC side of this converter is not overloaded, and, if the exchange power between the overloaded converter and an outside has been restored into a normal range and the other converter connected in parallel to the AC side of this converter is not overloaded, the overload restoration determining unit triggers an over overload limit exit logic unit; and the overload limit exit logic unit, comprising a first overload limit exit logic unit and a second overload limit exit logic unit;

the first overload limit exit logic unit enables this converter to exit from the one overloaded limit logic, maintains the control mode of the one overloaded converter at the active-wattless power control, and sets the active overload limit reference value $P_{ref\_oll}$ of the one overloaded converter to be less than or equal to the maximum permissible active power $P_{lim}$ to be exchanged of the one overloaded converter and the wattless overload reference value $Q_{ref\_oll}$ of this converter to be less than or equal to the maximum permissible wattless power $Q_{lim}$ to be exchanged of the one overloaded converter, that is:

$|P_{ref\_oll}|\leq|P_{lim}|$;

$|Q_{ref\_oll}|\leq|Q_{lim}|$;

the second overload limit exit logic unit enables the one overloaded converter to exit from the overload limit logic, and automatically or manually switches the control mode of the one overloaded converter to the voltage-frequency droop control.

13. The converter control method according to claim 4, wherein the backup solution includes at least one of removing a part of fans, running an AC-side energy dissipation device, running a DC-side energy dissipation device, and blocking the converter and turning off an AC incoming switch.

* * * * *